(12) United States Patent
Firth et al.

(10) Patent No.: US 10,596,674 B2
(45) Date of Patent: Mar. 24, 2020

(54) IMPROVEMENTS TO ROUTER APPARATUS

(71) Applicant: Power Box AG, Zug (CH)

(72) Inventors: Robert Firth, North Yorkshire (GB); Andrew Linton, North Yorkshire (GB)

(73) Assignee: Power Box AG, Zug (CH)

( * ) Notice: Subject to any disclaimer, the term of this patent is extended or adjusted under 35 U.S.C. 154(b) by 101 days.

(21) Appl. No.: 15/549,964

(22) PCT Filed: Jan. 18, 2017

(86) PCT No.: PCT/IB2017/000020
§ 371 (c)(1),
(2) Date: Aug. 9, 2017

(87) PCT Pub. No.: WO2017/125811
PCT Pub. Date: Jul. 27, 2017

(65) Prior Publication Data
US 2018/0021909 A1 Jan. 25, 2018

(30) Foreign Application Priority Data
Jan. 18, 2017 (GB) .................................. 1600885.6

(51) Int. Cl.
*B27C 5/10* (2006.01)
*B23Q 17/22* (2006.01)
*B23Q 9/00* (2006.01)

(52) U.S. Cl.
CPC ....... *B23Q 17/2233* (2013.01); *B23Q 9/0028* (2013.01); *B27C 5/10* (2013.01); *B23Q 2701/02* (2013.01); *B23Q 2717/006* (2013.01)

(58) Field of Classification Search
CPC ... B27C 5/02; B27C 5/10; Y10T 409/306608; B23Q 9/0028; B23Q 2701/02; B23Q 2717/006
See application file for complete search history.

(56) References Cited

U.S. PATENT DOCUMENTS 4,290,719 A * 9/1981 Worthington ............. B23C 1/20
144/136.95

FOREIGN PATENT DOCUMENTS

EP 1366873 12/2003

OTHER PUBLICATIONS

WeAreTwoDoorsDown: "Features of the Triton TRA-001/TRC-001 Router", Youtube, Jan. 29, 2014 (Jan. 29, 2014), XP054977228, Retrieved from the Internet: URL:https://www.youtube.com/watch?v=rRykNbGE5zs.

(Continued)

*Primary Examiner* — Matthew Katcoff
(74) *Attorney, Agent, or Firm* — Head, Johnson, Kachigian & Wilkinson, PC

(57) ABSTRACT

A router power tool including a housing mounted to be moveable with respect to and spaced from a base, said housing including a motor to rotate a shaft which includes, at its free end, a tool holder for a cutting tool, said shaft extending from the housing such that the tool holder is located at or adjacent to the base and said housing is connected to the base by at least one extendable assembly. The power tool is selectively locatable with a guide plate via retaining means. The guide plate includes apertures for the receipt of retaining means to allow the power tool to be engaged therewith and datum tabs to contact with the power tool to ensure the accurate location of the power tool with the guide plate when held in position by the retaining means.

11 Claims, 18 Drawing Sheets

(56) References Cited

OTHER PUBLICATIONS

Figure 1A:
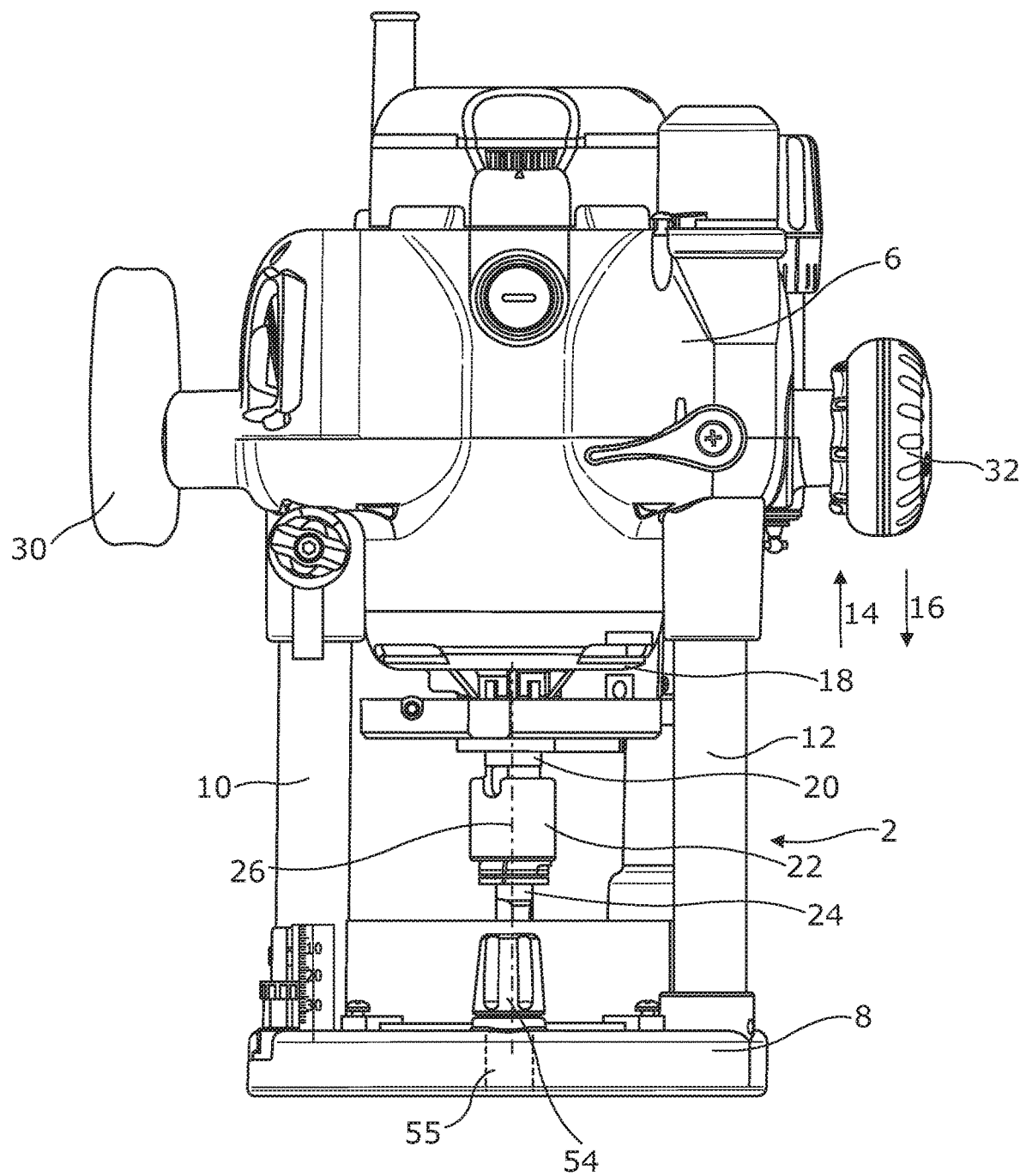

Darrell Morris: "Triton Dual Mode Precision Plunge Router TRA001", Mar. 21, 2012 (Mar. 21, 2012), pp. 1-62, XP055356831, Retrieved from the Internet: URL:http://go.rockler.com/tech/48271TritonRouterInstructions.pdf.

* cited by examiner

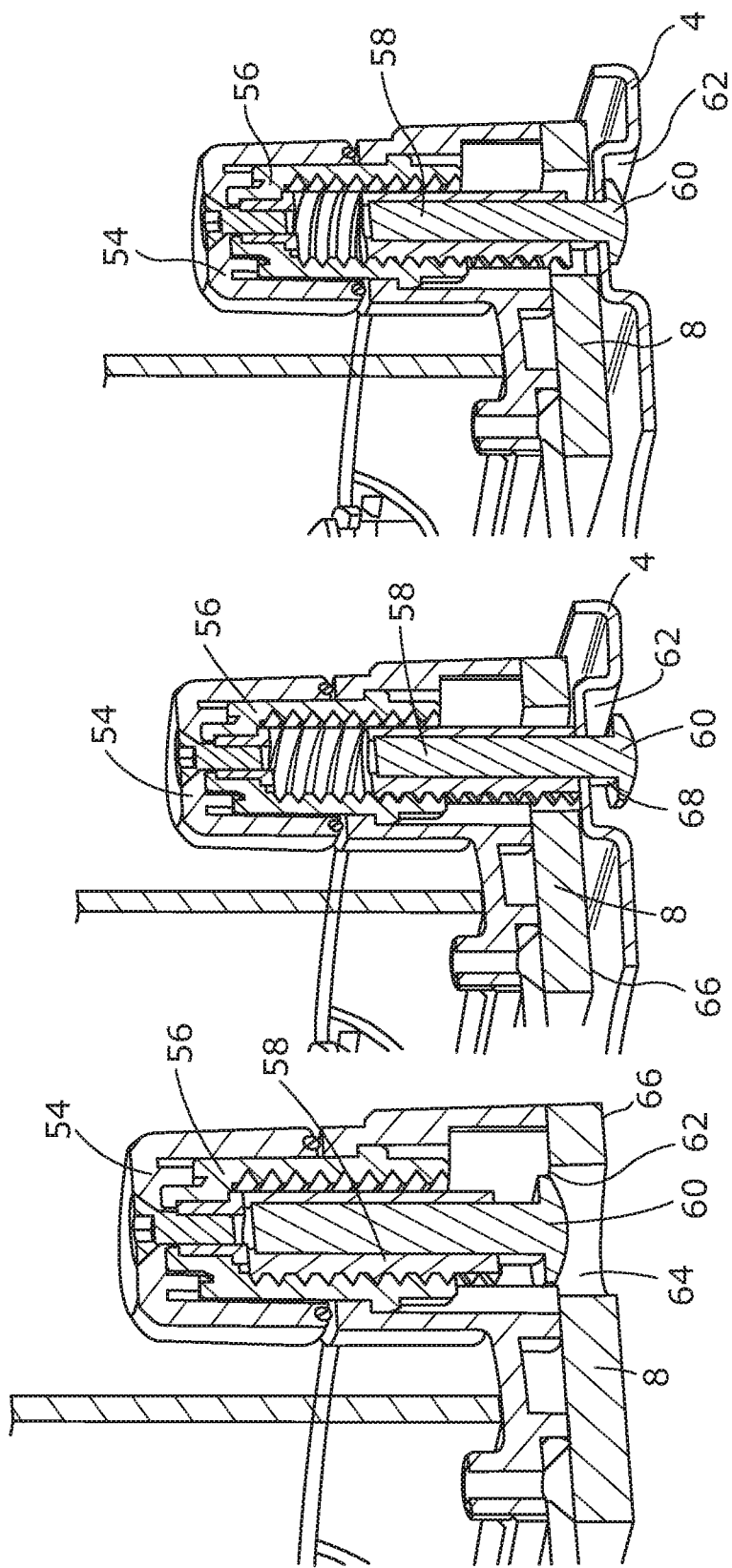

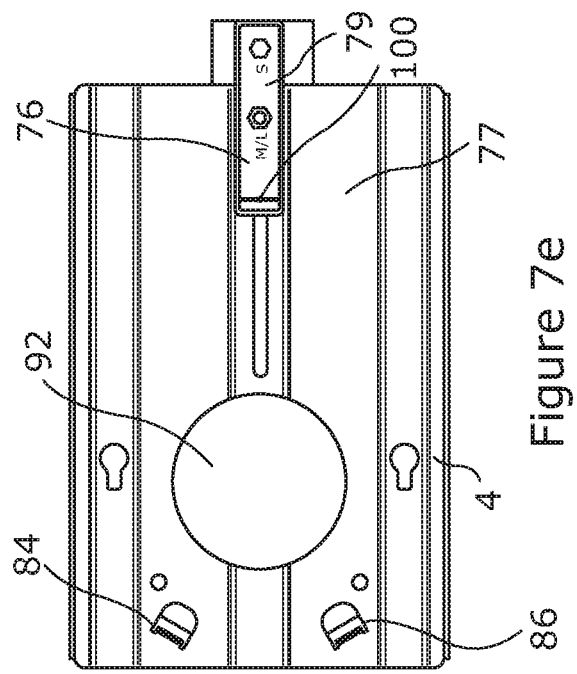
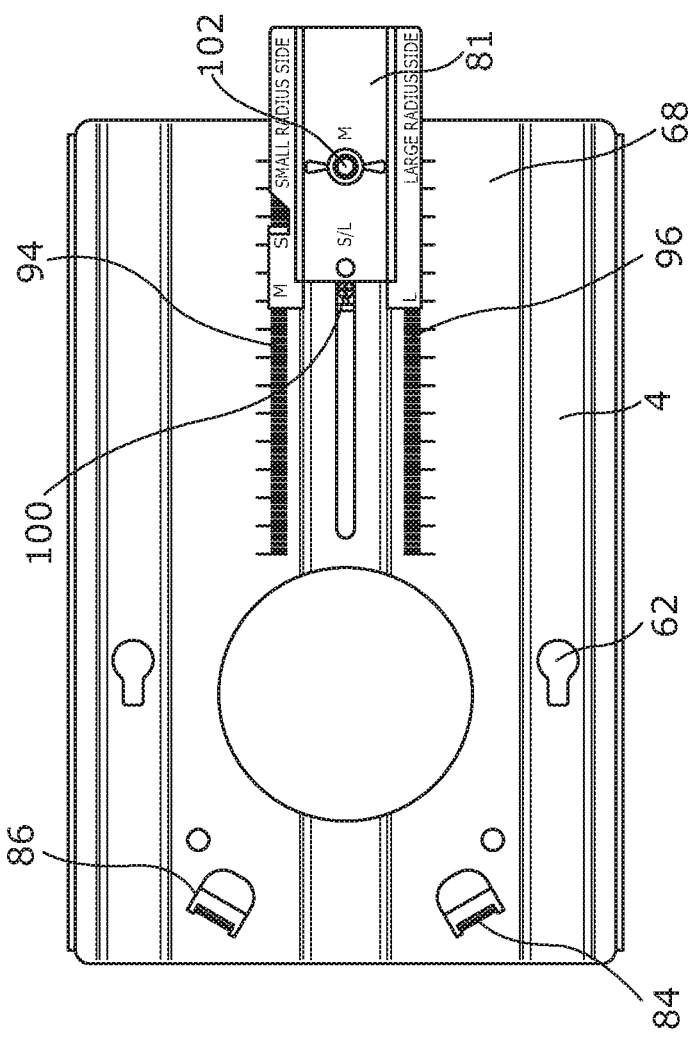
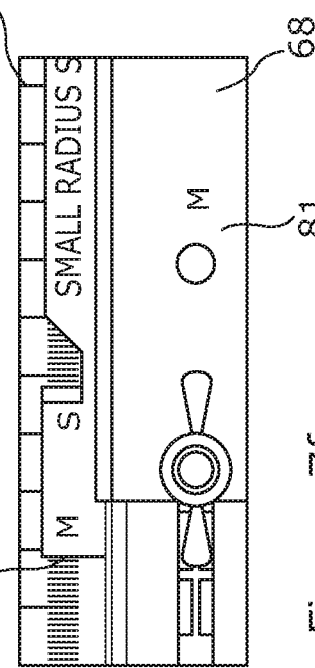
Figure 7e
Figure 7d
Figure 7f

IMPROVEMENTS TO ROUTER APPARATUS

This invention relates to improvements relating to an electric power tool, and particularly, although not necessarily exclusively, power tools of a form commonly known as a router with the tool being capable of performing work on a workpiece via a rotating cutting tool. The router can typically be mounted for use above or below a work surface on which the workpiece is located. When in the configuration of use above the work surface, the movement of the tool is typically guided by hand, or alternatively the workpiece on which the work is being performed can be moved with respect to the tool which is held in a fixed position and when the tool is in the second configuration of use the tool is typically attached to the workbench and the movement of the housing of the tool with respect to the work surface and work piece is performed by a winding mechanism.

The router is provided with a housing in which there is located a motor provided in connection with a shaft on which a tool holder and cutting tool are mounted. The shaft, tool holder and cutting tool are aligned along the longitudinal axis of the shaft so that the shaft, tool holder and cutting tool are rotated about said axis. A base plate is connected to the housing by extendable assemblies and the cutting tool extends through an aperture in the base to perform the cutting operation on the workpiece which lies to the opposite side of the base from the housing.

The use of routers is well known and the same are used in many numbers on a worldwide basis. However problems persist in the use of the same.

A known problem is being able to guide and position the router accurately with regard to the workpiece and/or the worktable or surface on which the same may be mounted. Typically, there is a need to be able to position the cutting tool accurately with regard to a datum in order that the work which is performed by the cutting tool is performed in the required location on the workpiece and it can also be desired that the same work can be performed on successive workpieces repeatedly and accurately. It is therefore important that the router can be accurately positioned and, once positioned, that the router is retained in that position. A further problem is that it can be difficult to fit the guide apparatus to the base of the router.

It is an aim of the present invention to provide an improved router and, in particular, a router which overcomes at least one or a combination of the above disadvantages.

In a first aspect of the invention there is provided a power tool which includes a housing and a base, said housing mounted to be moveable with respect to and spaced from the base, said housing including a motor to rotate a shaft which includes, at its free end, a tool holder for a cutting tool, said shaft extending from the housing such that the tool holder can be located at or adjacent to the base and said housing is connected to the base by at least one extendable assembly, said cutting tool provided to be movable through an aperture in the base to contact with and perform work on a workpiece located on the side of the base opposing the side at which the housing is located and said base is selectively locatable with a work surface or a guide plate component to act as a guide for the tool and wherein said base is selectively locatable via at least one engagement means provided on the power tool and which is movable between a first, engaging, position and a second release position said engagement means including a gripping portion which is provided with an internal threaded formation or portion to receive a shaft with which a locating head is formed or attached, said locating head provided to be received in an aperture or passage formed on the guide plate or worksurface and the shaft passes through an aperture in the base and into the internal threaded formation of the gripping portion which is located on the opposite side of the base from the locating head Typically the power tool can be selectively retained with the guide plate in one embodiment of use or the worksurface in another embodiment of use and this embodiment is most typically when the router is to be attached to the underside of the worksurface for use.

Typically the shaft is in threaded engagement with the internal threaded formation of the gripping portion and preferably the pitch of the threaded engagement is such so as to allow the adjustment of the relative position of the shaft and locating head with respect to the base to be achieved with a relatively small number of turns of the gripping portion and thereby allow location and release of the base with either of the guide plate or worksurface to be achieved relatively quickly by the user whilst maintaining the required location force for safe use of the apparatus.

In one embodiment the base is provided with a guide plate and a fence which acts as a means to position the base, and hence tool, with a workpiece on which work is to be performed.

In one embodiment engagement means are provided on the fence plate to allow measurement means to be located therewith and thereby allow the distance from the fence to the cutting tool to be accurately measured.

In one embodiment the measurement means are an analogue or digital caliper. Typically the measurement means can be selectively engaged and released with the engagement means. In one embodiment, by disengaging the fence from the guide plate, the fence and the measurement means can be rotated around 90 degrees and used as a standalone item to measure the distance between the point of a cutting tool and a datum surface, which is particularly of use when the tool is in an in use position on the underside of the work surface.

In another embodiment of the invention, there is provided a measuring location system or trammel on the guide plate which allows an extended circular path to be achieved and the measuring system can be provided in at least two configurations to measure a first range of relatively small diameter and a second mode of use in order to measure a second range of relatively larger diameter. In one embodiment three configurations are possible.

In one embodiment the guide plate includes a first measurement scale for reference when the first range of measurement is required and a second measurement scale for reference when the second range of measurement is required.

Typically the first and second measurement scales are located on opposite sides of a slidable portion which can be adjusted to suit the required measurement. In one embodiment the slidable portion is located with the guide plate in a first configuration when the first mode of measurement is required and in a second configuration when the second mode of measurement is required.

In a further embodiment the guide plate is provided with a fence distance scale assembly which allows the distance of the fence from the tool centre.

In one embodiment a guide bush can be selectively located with the base via a base by rotational movement of engagement means about an axis. Typically, the engagement means comprise securing means to secure a locking component to the base or a component located with the base, whilst allowing rotation of the locking means.

Typically said locking means has a portion which when in the engaging position extends inwardly beyond the periphery of the aperture to a greater extent than the remainder of the locking means so as to secure the bush component in position.

Typically a plurality of engagement means are provided at spaced locations around the periphery of the aperture.

In another aspect of the invention there is provided A guide plate for a router power tool, wherein said guide plate includes apertures for the receipt of retaining means to allow the power tool to be engaged therewith and datum tabs to contact with the power tool to ensure the accurate location of the power tool with the guide plate when held in position by the retaining means.

In one embodiment a fence is engaged with the guide plate, said fence including measurement means to allow the distance from the fence to the cutting tool of the power tool to be measured.

In another embodiment a measuring location system or trammel is provided for use in at least two modes, a first mode to measure a first range of circles of relatively small diameter and a second mode to measure a second range of circles of relatively larger diameter.

Figure 1B:
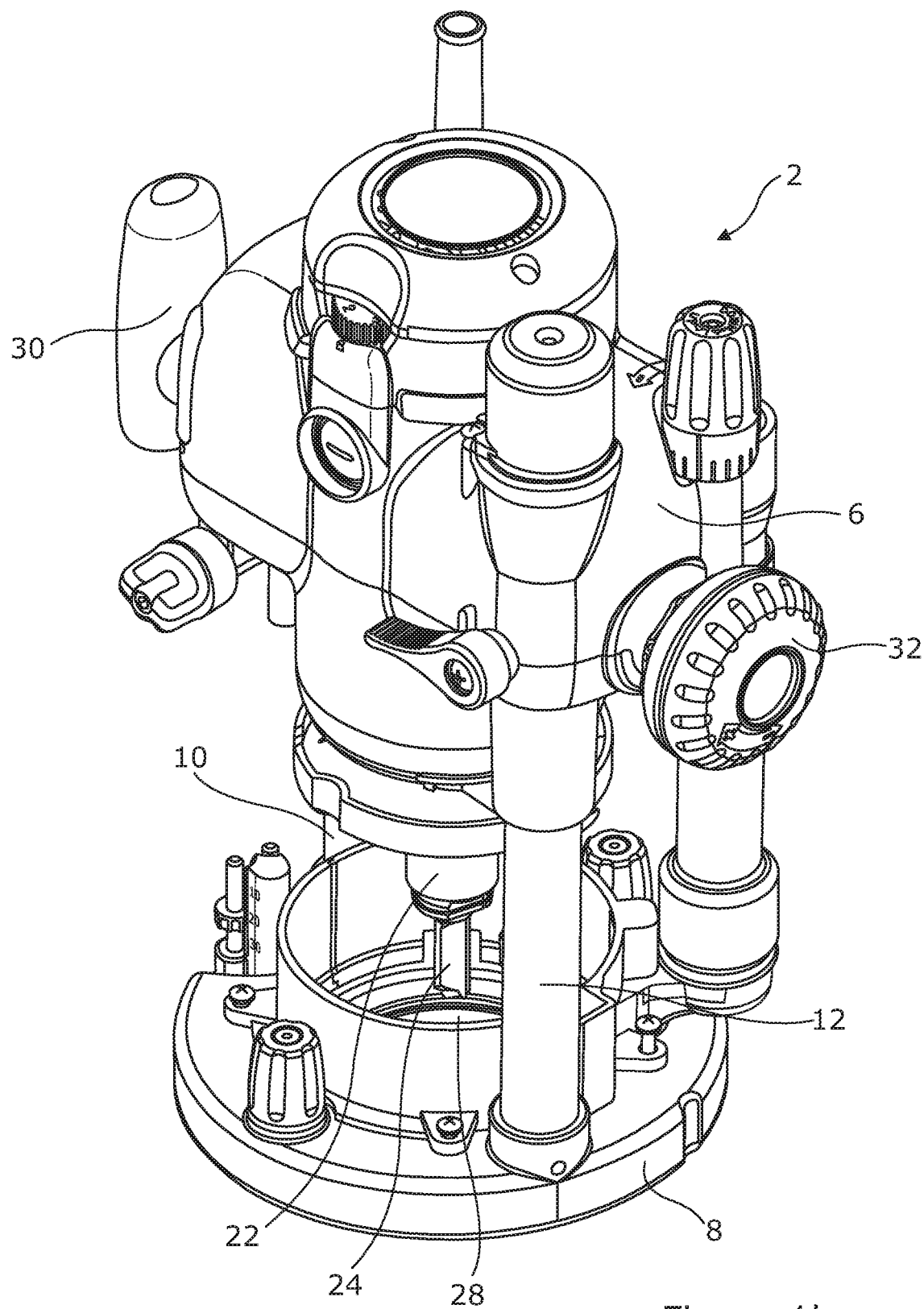
Figure 1C:
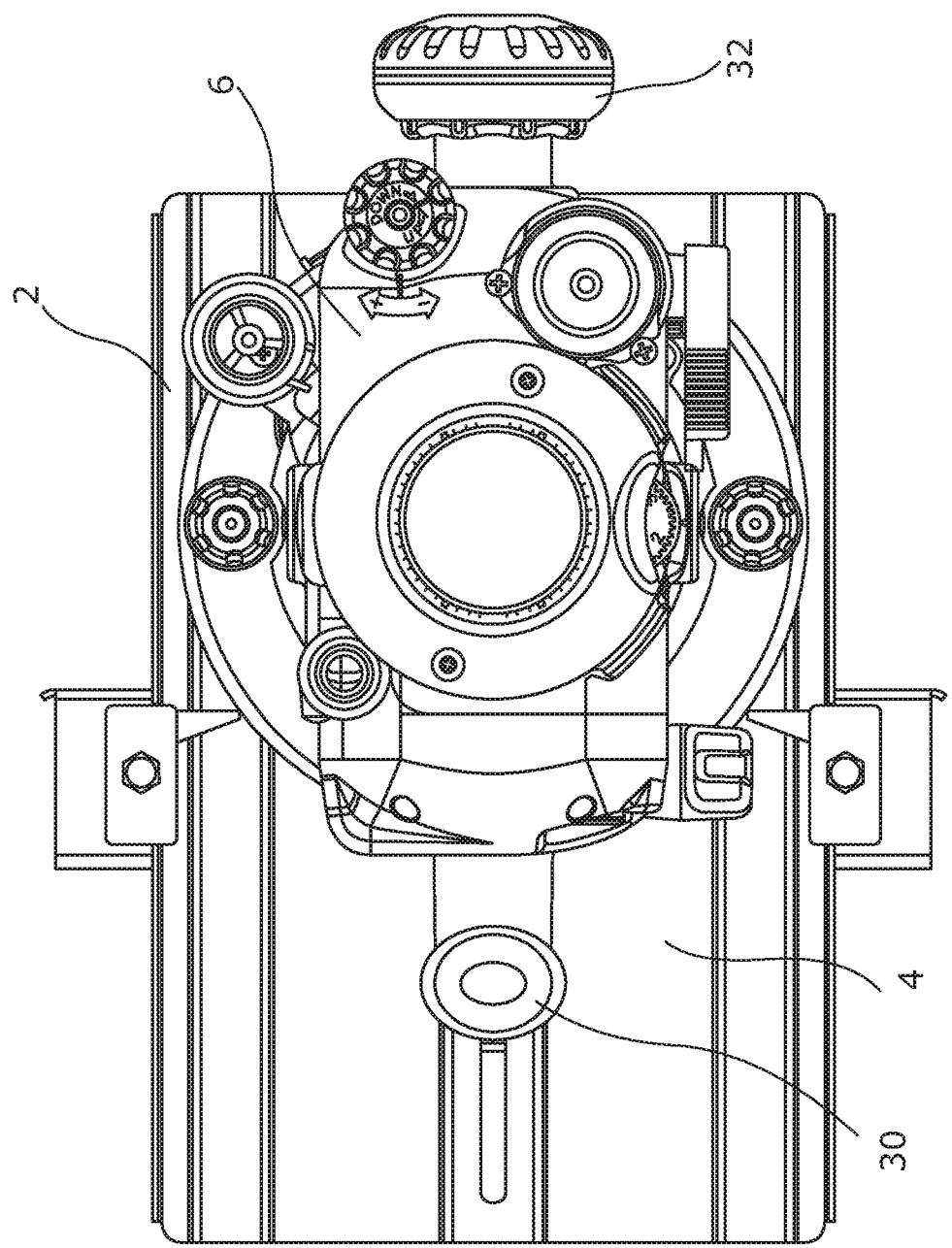
Figure 5:
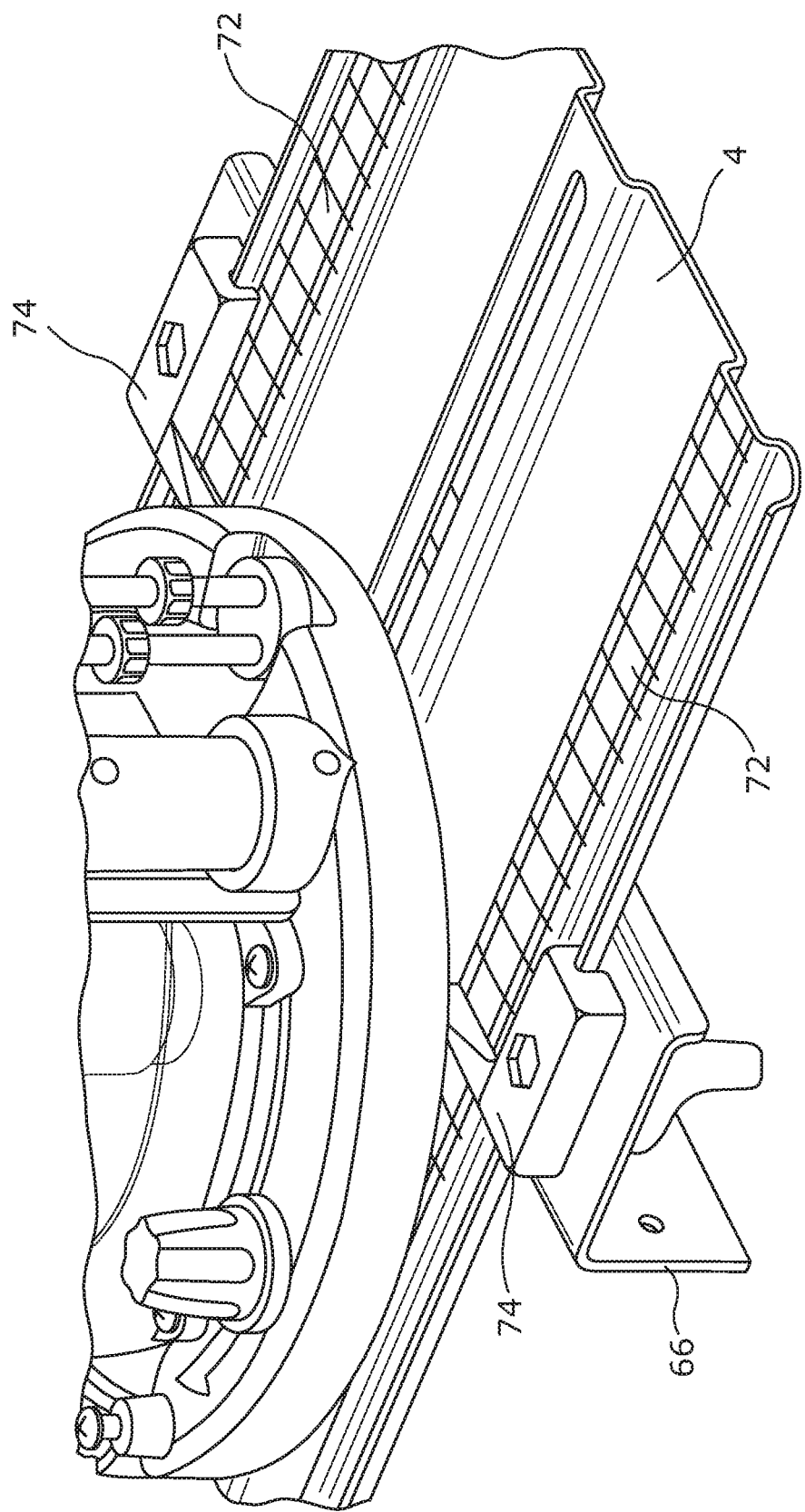

Specific embodiments of the invention are now described with reference to the accompanying drawings; wherein FIGS. 1a-c illustrate a perspective, elevation and plan views of first and second embodiments of a router tool in accordance with one embodiment of the invention; and FIGS. 2a-d illustrate an embodiment for the attachment of a bush guide with the base;

FIGS. 3a-e illustrate an embodiment for the attachment of the router base to the guide plate;

FIGS. 4a-d illustrate an embodiment of a fence rule attachment means;

FIG. 5 illustrate an embodiment of a fence distance scale;

FIGS. 6a-d illustrate the guide plate in accordance with one embodiment of the invention, and FIGS. 7a-j illustrate an embodiment of a trammel circle cutting measuring system in accordance with one embodiment of the invention.

Referring firstly to FIGS. 1a-b there is illustrated a router power tool 2 in accordance with the invention in one configuration of use and, in FIG. 1c, the router power tool is shown in a second configuration of use. The router can be used in two main positions. The first position is that shown in the Figures in which the same is located on and above a work surface on which a workpiece for which the tool is to be used is located. In an alternative position the router can be turned through 180 degrees so that the base 8 is attached to the underside of the work surface so that effectively the router is used upside down and is located below the work surface.

In one configuration the base 8 may be attached to a guide plate 4 as shown in FIG. 1c, or may be attached directly to the work surface such as that provided as part of a workcentre of the type disclosed in the applicant's patent application GB2517640 and the contents of which are incorporated herein, or may be used in a freestanding mode as illustrated in FIGS. 1a-b.

The router includes a housing 6 which is connected to the base 8 by first and second extendable members 10,12 so as to be movable in relation thereto as indicated by arrows 14,16. From the underside 18 of the housing extends a shaft 20, which at its free end includes a tool holder 22. The tool holder receives a tool 24 and the shaft, tool holder and tool are rotated about axis 26 by connection of the shaft with a motor (not shown) located within the housing 6.

The tool passes through an aperture 28 in the base in order to engage and perform the work on the workpiece. The tool also includes first and second handles 30,32 which are located on the housing 6 on opposing sides of the same and typically at or adjacent to the first and second extendable assemblies 10,12 respectively. The handles are provided so as to allow the housing to be moved downwardly towards the base and generally to allow control of the tool in use.

Figure 2A:
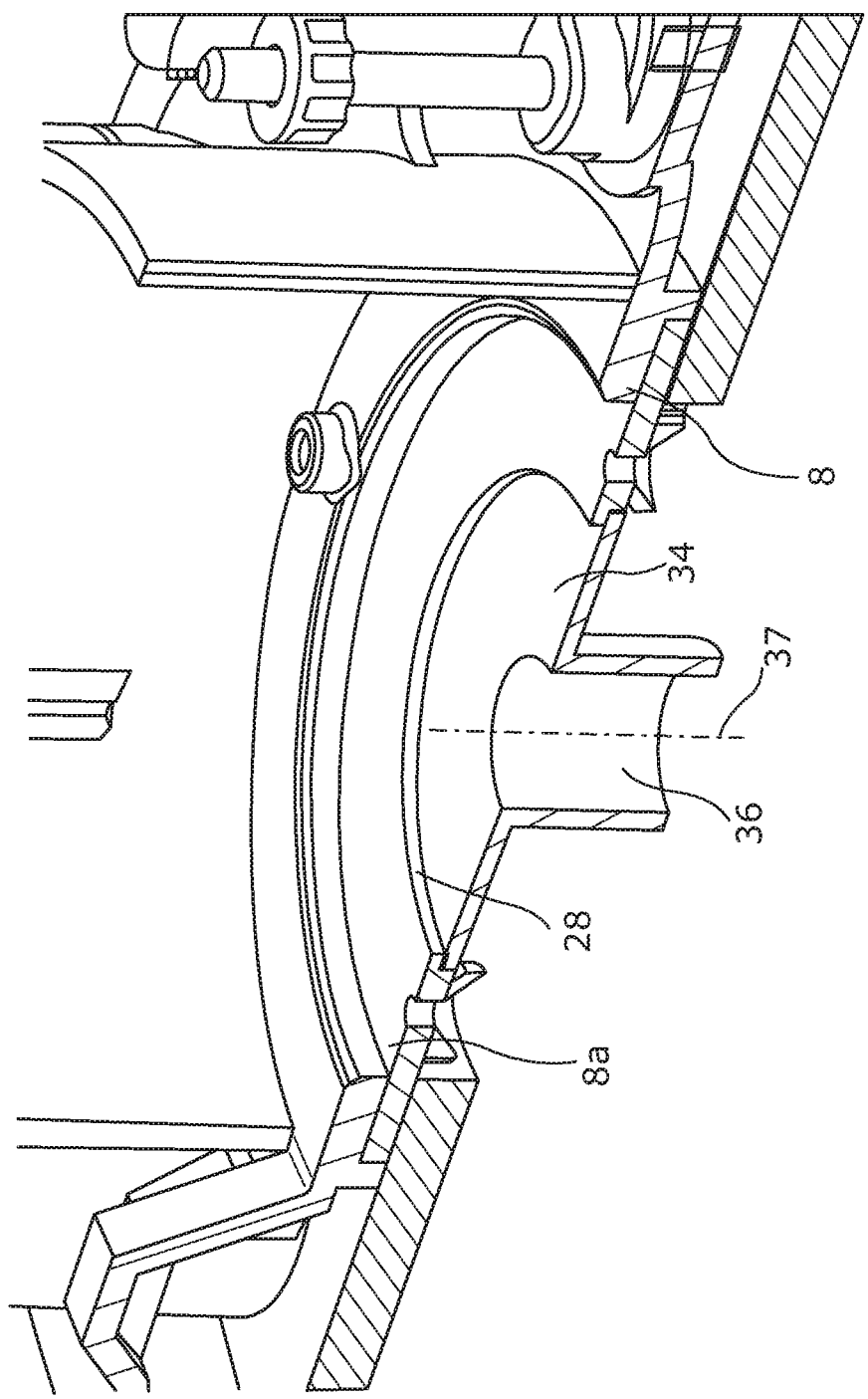
Figure 2B:
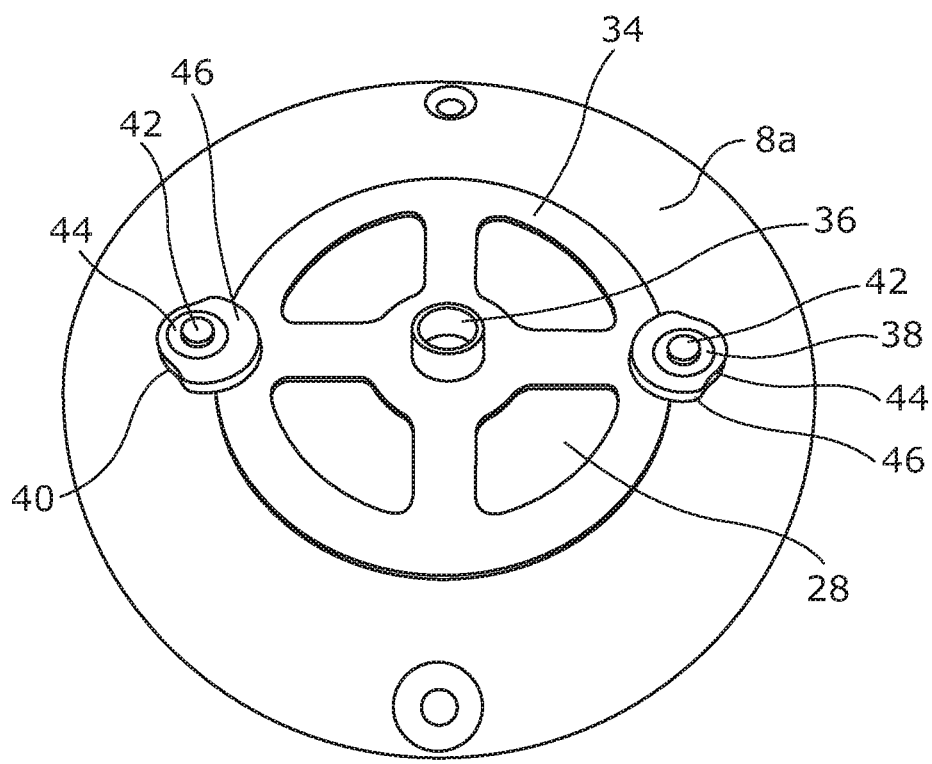
Figure 2C:
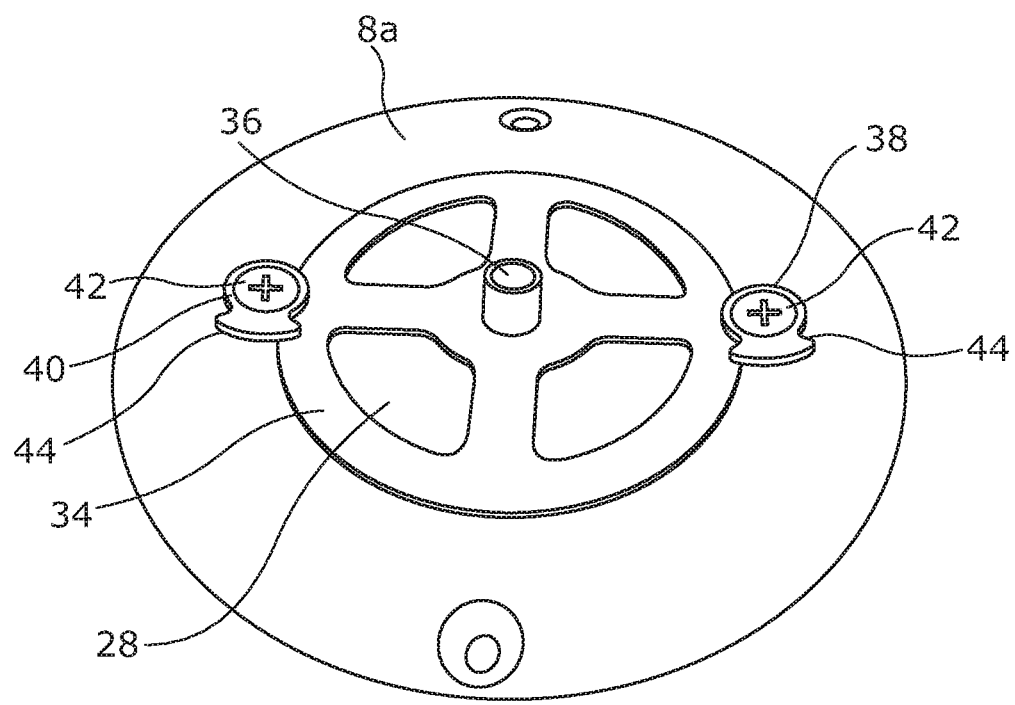
Figure 2D:
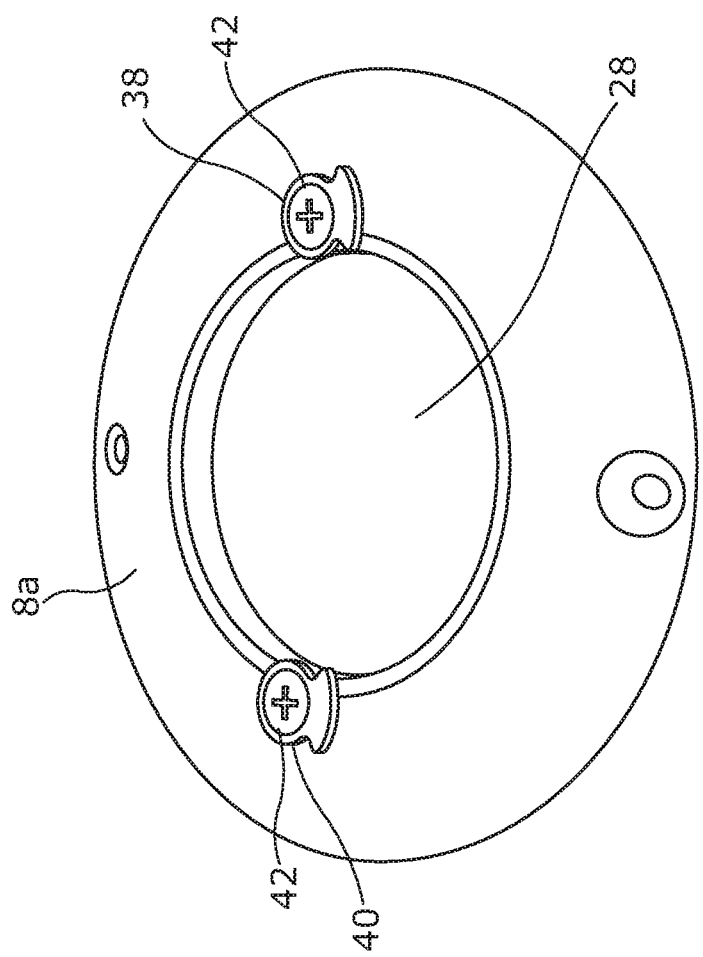
Figure 2D:
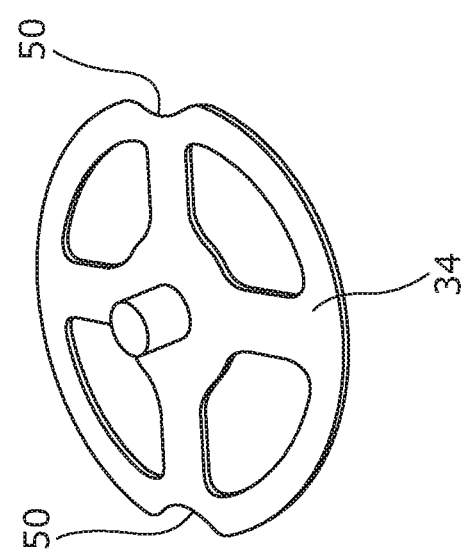
Figure 3A:
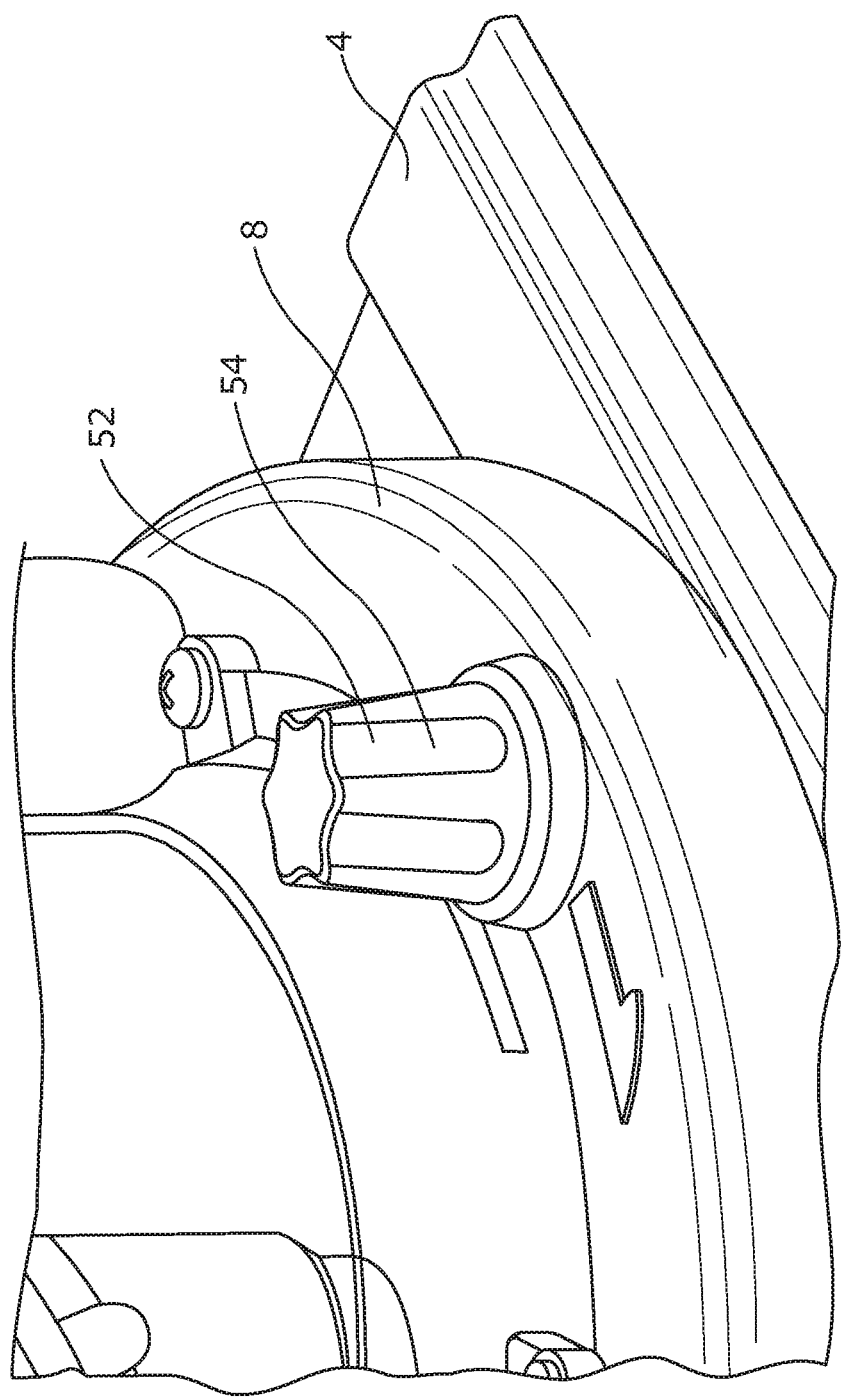
Figure 3B:
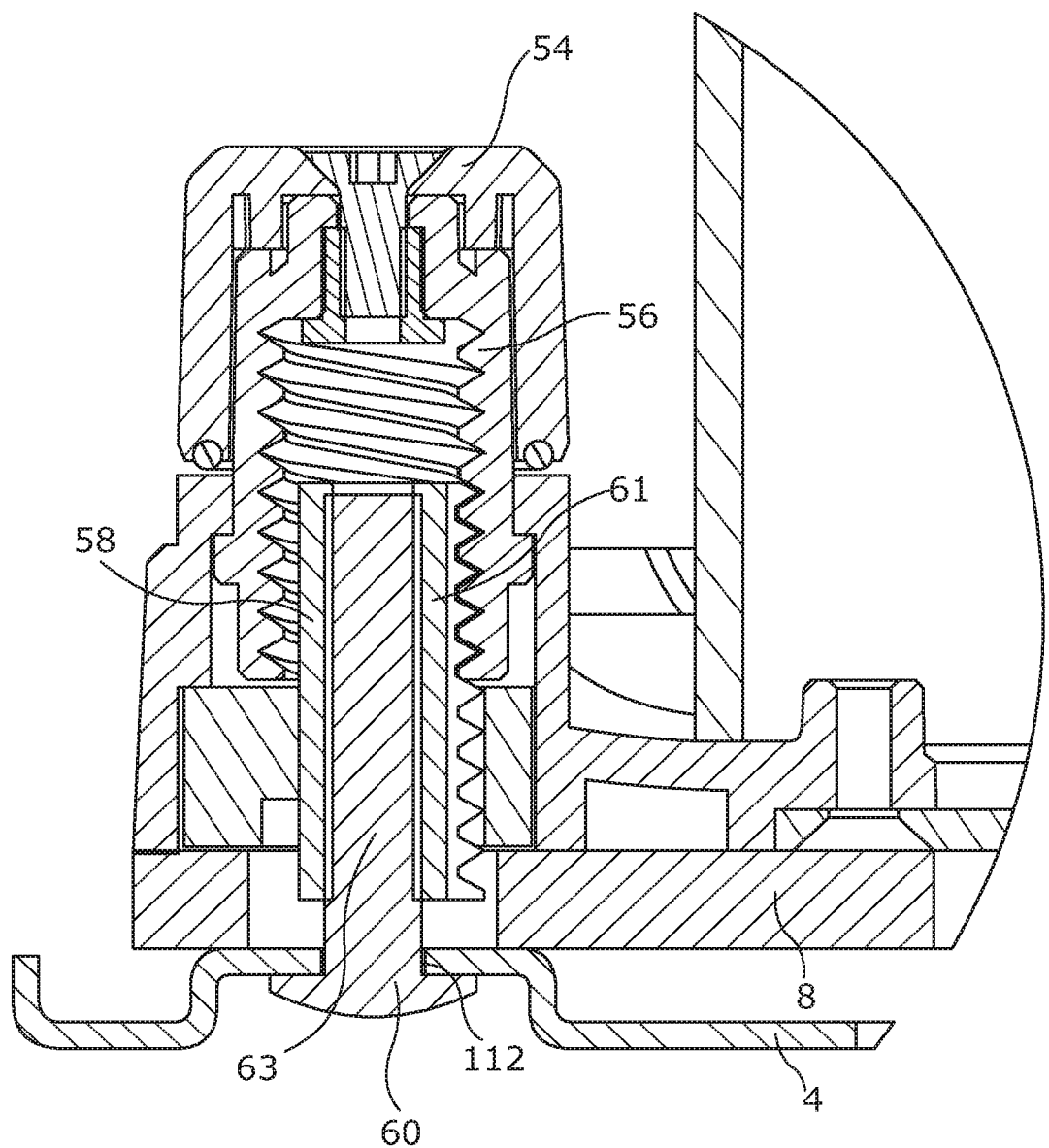

Turning now to FIGS. 2a-d there is illustrated the base 8 in section about its centre in FIG. 2a and a first base component 8a is shown in location in FIG. 2a. The component 8a can be engaged with the base 8 as shown in FIG. 2a and is shown separated from the same in FIGS. 2b-d for ease of illustration. A bush 34 is shown in an in-use position with the component 8a in FIGS. 2a-c and a released position in FIG. 2d. It can be seen that when in the in use position, the bush 34 provides a guide aperture 36 for the cutting tool and the same sits in the aperture 28 which is reduced in size by the location therewith of the base component 8a. As the bush 34 may be selectively used, and also there will typically be a range of bushes with different sizes of guide apertures 36 for selective use depending on the size of cutting tool 24 in use at that time, there is a need to be able to move the bush 34 between the in use position and the removed position frequently. Also, as the bush 34 acts as a guide for the cutting tool when in use, the location of the same is required to be accurate whilst, at the same time requiring the minimum time and effort to engage and release the same. This is achieved in the current invention by providing first and second engagement means 38,40 which are secured to the base component 8a by screws 42 and which include locking means 44 which have a portion 46 which, when rotated to overlie the aperture 28, engage with the bush 34 as shown in FIG. 2b and serve to retain the same in the in use position. To release the bush, the locking portion can be rotated so that the portion 46 is removed from the aperture as shown in FIG. 2c and the bush can then be released. In order to further improve the release, the bush may be provided with indents 50 as shown in FIG. 2d which are located to match with the location of the engagement means 38, 40. A further advantage is that as the component 8a is located axially of the aperture 28, so, as the bush is accurately located by the engagement means in accordance with the invention, the centre axis 37 of the guide aperture 36 in the bush will be located along the axis 26 of the aperture 28 and cutting tool 24 shown in FIG. 1b so that accuracy of cut can be ensured.

Turning now to FIGS. 3a-e there is illustrated the provision of retaining means to locate the base 8 of the router with the guide plate 4. The retaining means 52 comprise a gripping portion 54 which is provided with an internal threaded formation 56 which receives a shaft 58 on which a locating head 60 is formed or attached. The shaft 58 can be formed as is shown in this case and with reference to FIG. 3b, as two parts, a first part 61 in threaded engagement with formation 56 and a second part 63 in which the locating head is formed and which is in threaded engagement with the first part 61. Alternatively the shaft 58 can be provided as a single unitary component with the locating head 60 and in threaded engagement with the formation 56.

Typically the locating head 60 can be moved to a number of positions by rotation of the gripping portion 54. In FIG. 3c the locating head 60 is shown in a fully retracted position in which the same is withdrawn into an aperture 64 in the base 8 so that the same does not protrude beyond the underside 66 of the base 8 and the base can therefore be positioned directly onto a workpiece. FIG. 3d shows the locating head 60 in a fully extended position and thereby allows the same to be moved into, typically a keyhole aperture 62, in the guide plate 4 and the guide plate to be positioned in the gap between the underside 66 of the base 8 and the top face 68 of the locating head 60. When in position, the gripping portion 54 can then be rotated to draw the locating head 60 towards the base 8 and thereby tighten the guide plate 4 and base 8 together for use as illustrated in FIG. 3e.

It should be appreciated that the same attachment apparatus and method can be used when a work surface is substituted in position instead of the guide plate 4 and the router is positioned in an inverted position on the underside of the worksurface.

The provision of the threaded pitch between the internal threaded formation 56 and the shaft 58 being relatively high reduces the number of turns of the gripping portion 54 which are required to move the locating head between the positions shown in FIGS. 3c-e and so make the change of the condition more quickly achievable than with conventional mechanisms.

Figure 6A:
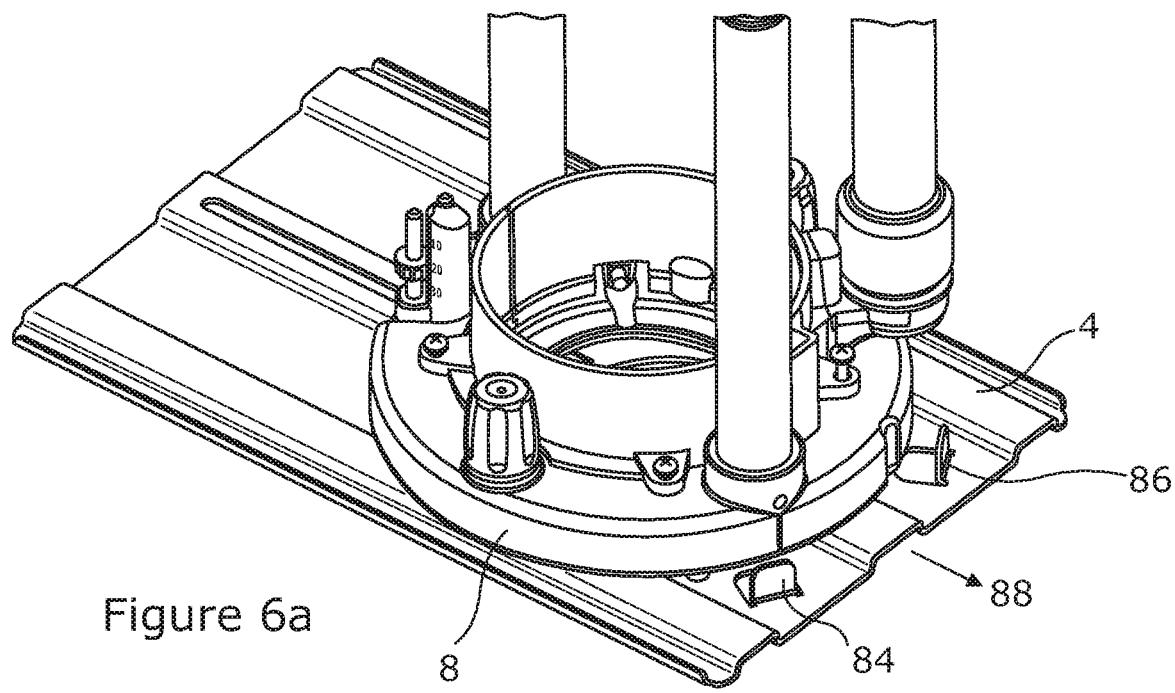
Figure 6B:
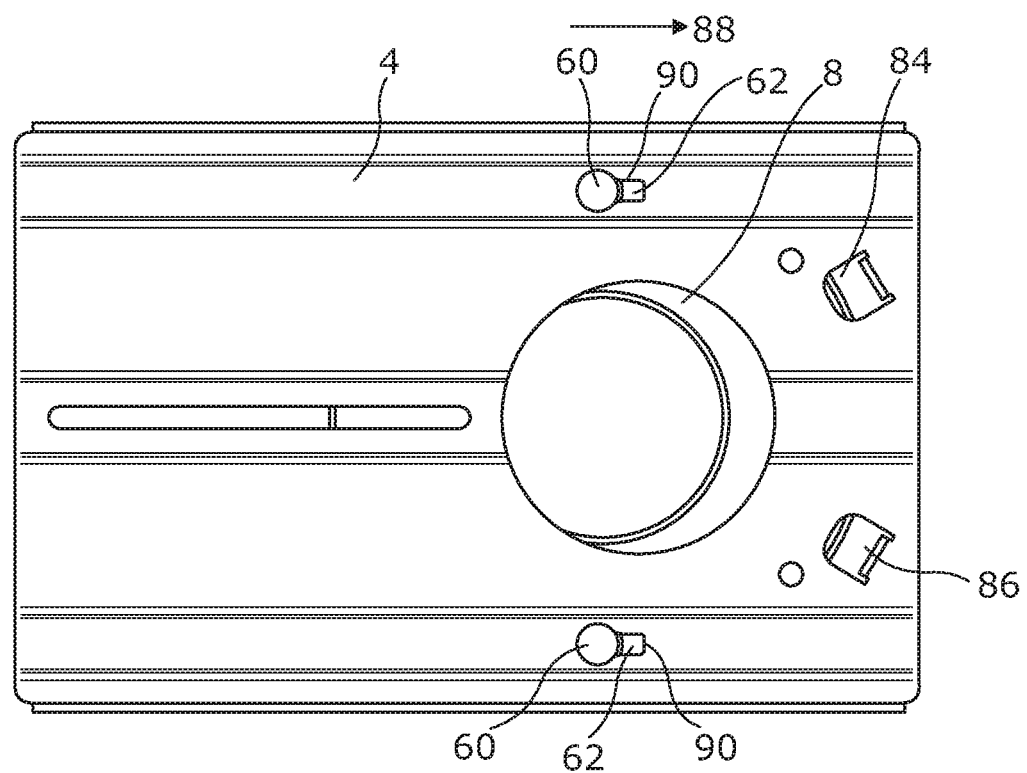

Referring to FIGS. 6a-d there is illustrated the manner in which the base 8 can be located with the guide plate 4 in accordance with the invention. FIGS. 6a and b illustrate the base 8 and tool having been placed on the guide plate 4 with the locating head of the engagement means 52 being positioned in the wider part of the keyhole slots 62 on the guide plate 4 as illustrated in FIG. 6b.

It is shown that the guide plate 4 includes first and second datum tabs 84, 86 which protrude upwardly from the guide plate and against which the base is required to contact to provide an accurate datum location for the same with respect to the guide plate. This is achieved by, when the apparatus is in the condition also illustrated in FIG. 3d, sliding the base to move the locating heads 60 into the narrower portions 90 of the keyhole slots 62 in the direction of arrow 88 and also to contact the datum tabs 84, 86 and take up the position shown in FIGS. 6c and d. In this position the side wall of the base 8 contacts the tabs 84, 86 and the engagement means 52 can then be tightened to retain the locating heads 60 in the slots 62 and retain the tool in position with respect to the guide plate 4 as illustrated in FIG. 3e. It will also be seen in FIG. 6d that the aperture 28 which passes through the base is axially located on the same axis 26 as the aperture 92 in the guide plate.

Figure 4B:
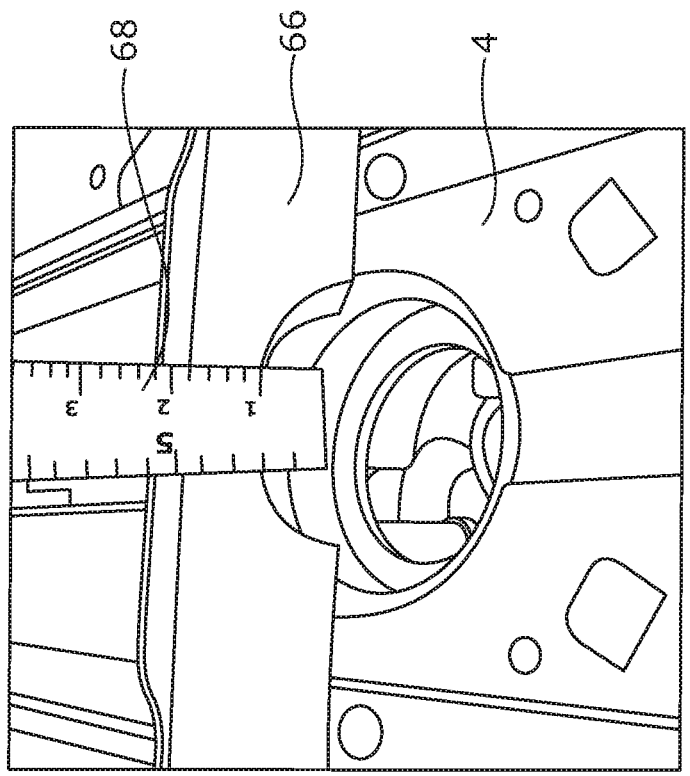
Figure 4A:
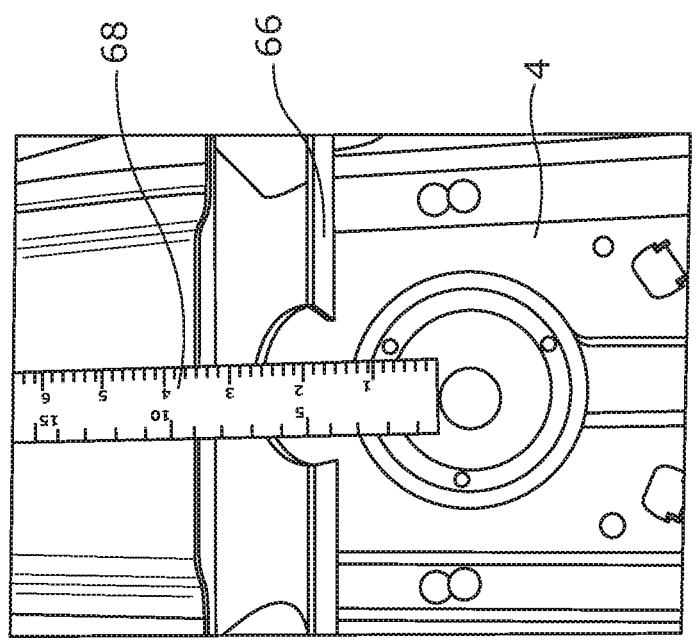
Figure 4D:
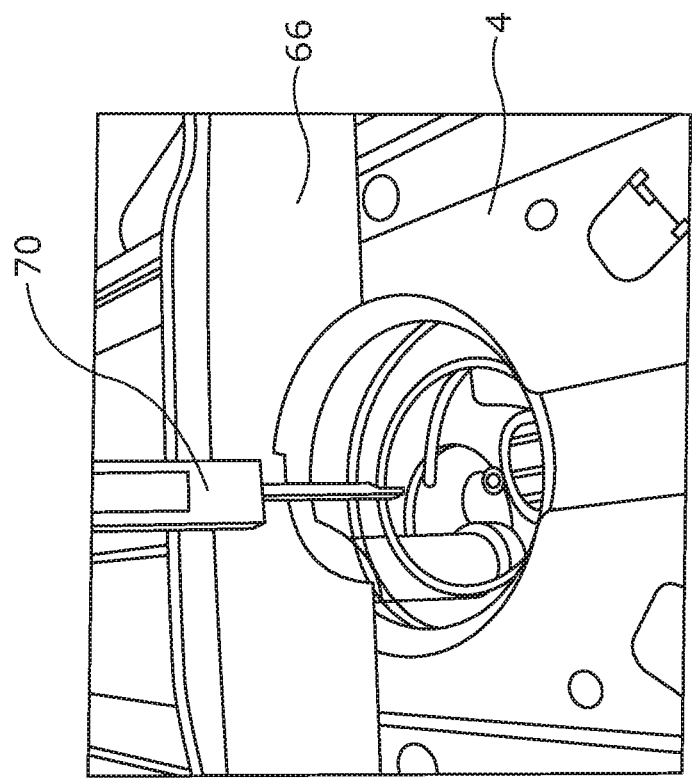
Figure 4C:
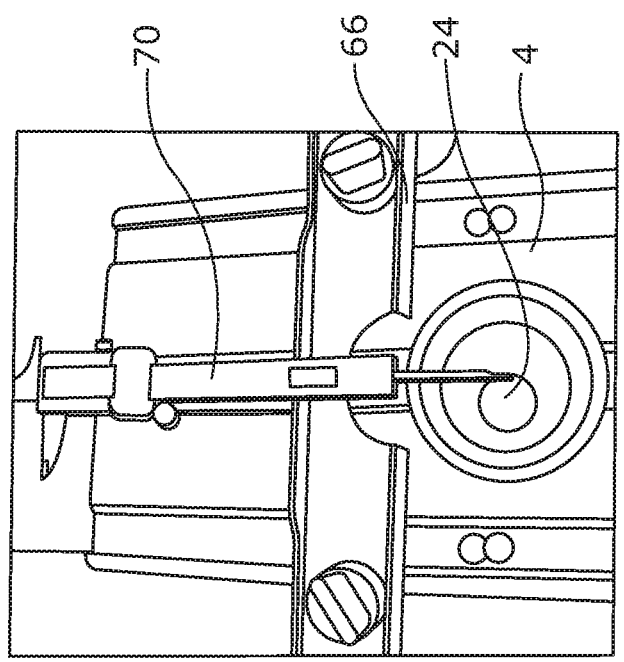

In one embodiment the guide plate 4 is provided with a fence 66 which acts as a means to position the guide plate 4 and hence tool 24 thereto with respect to an edge of, for example, the workpiece on which the work is to be performed as shown in FIGS. 4a-d and FIG. 7j. Engagement means 120 are provided on the fence to allow measurement means in the form of a rule 68 as shown in FIGS. 4a and b, or calipers 70 to be located therewith and thereby allow the distance from the fence to the cutting tool to be accurately measured.

As is shown in FIGS. 4a and c, the measurement means can be used in a first position with the fence in position on the guide plate so to measure the distance between the fence 66 and the cutting tool 24. Alternatively the fence 66 and measurement means can be removed from the guide plate 4 and rotated around 90 degrees as shown in FIGS. 4b and d and used to measure the distance from the point of the cutting tool 24 and the work surface which is particularly of use when the tool is in an in use position on the underside of the work surface.

As shown in FIG. 5, the guide plate 4 is provided with a fence 66 and a distance scale which includes scale markings 72 which show the distance to the centre of the tool 24 and which can be read in conjunction with the markers 74 located in line with the fence 66 so as to indicate the position of the fence with respect to the scale.

Figure 6C:
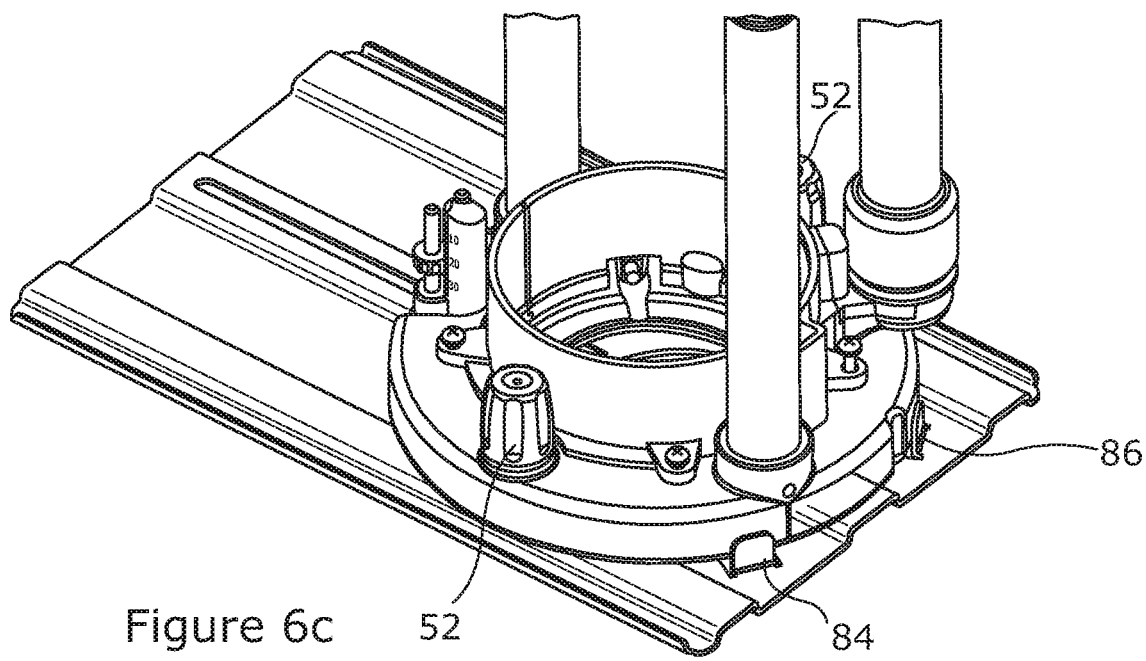
Figure 6D:
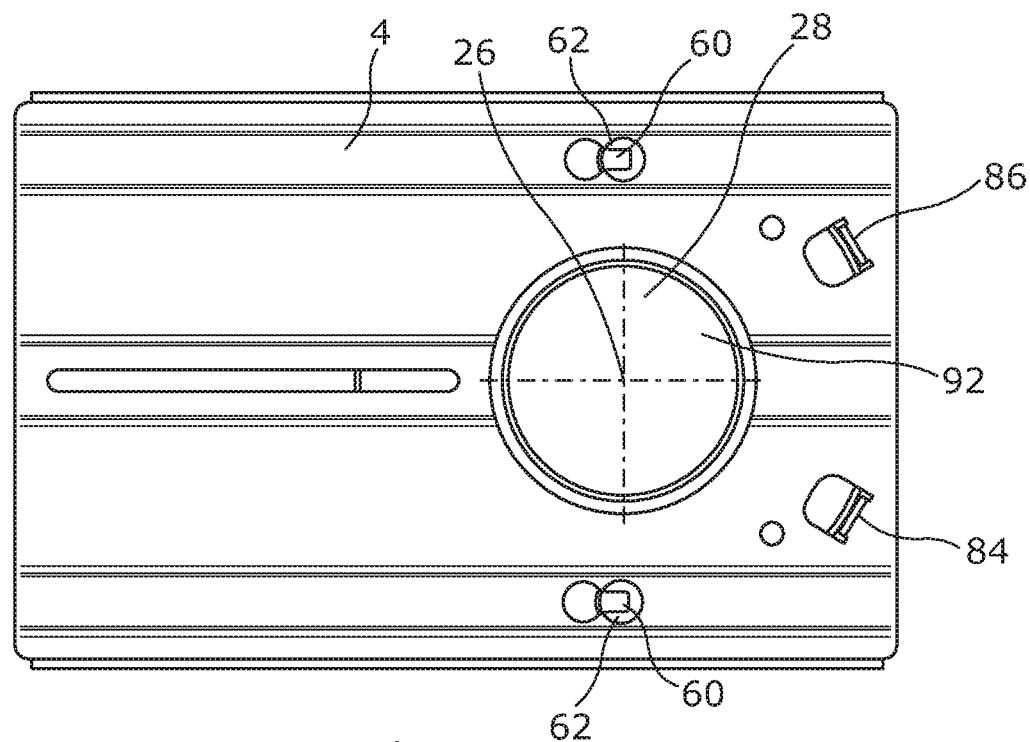

FIGS. 7a-j illustrate the manner in which measuring means can be used accurately when the base 8 and tool is in the accurate datum position shown in FIGS. 6c-d.

Figure 7A:
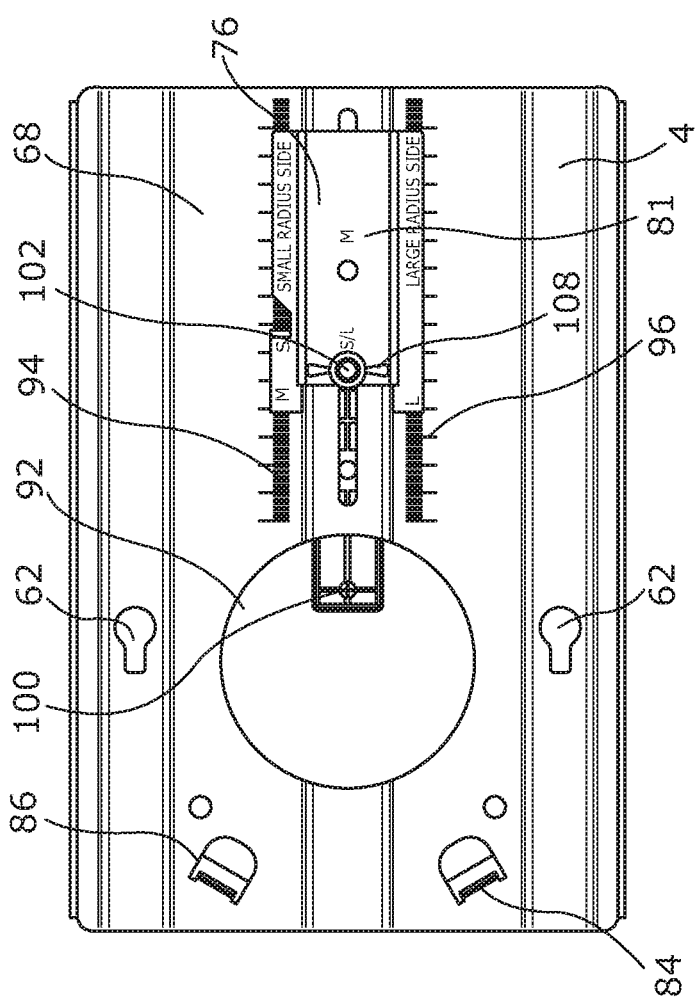
Figure 7B:
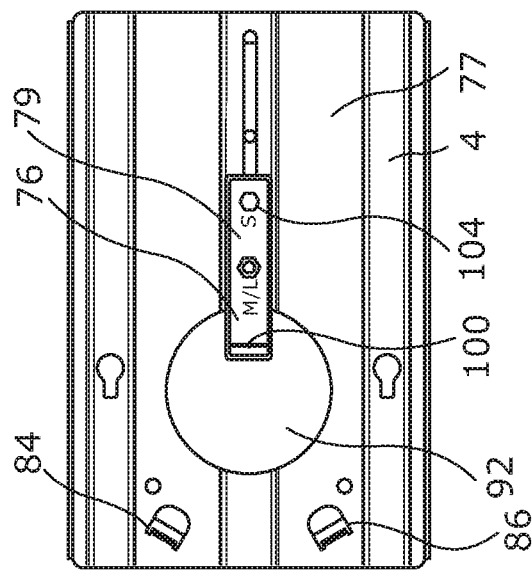
Figure 7C:
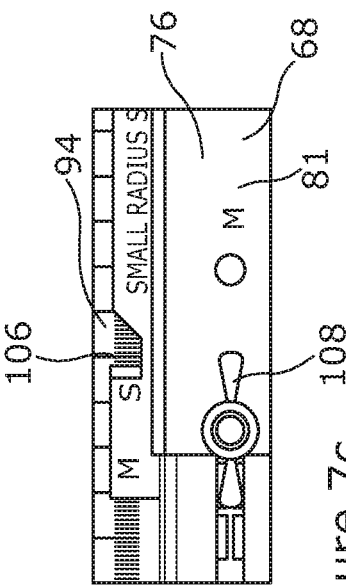
Figure 7H:
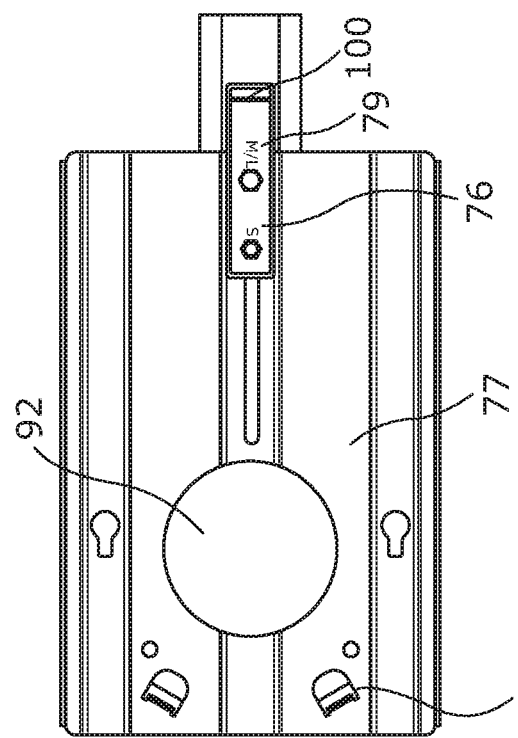
Figure 7G:
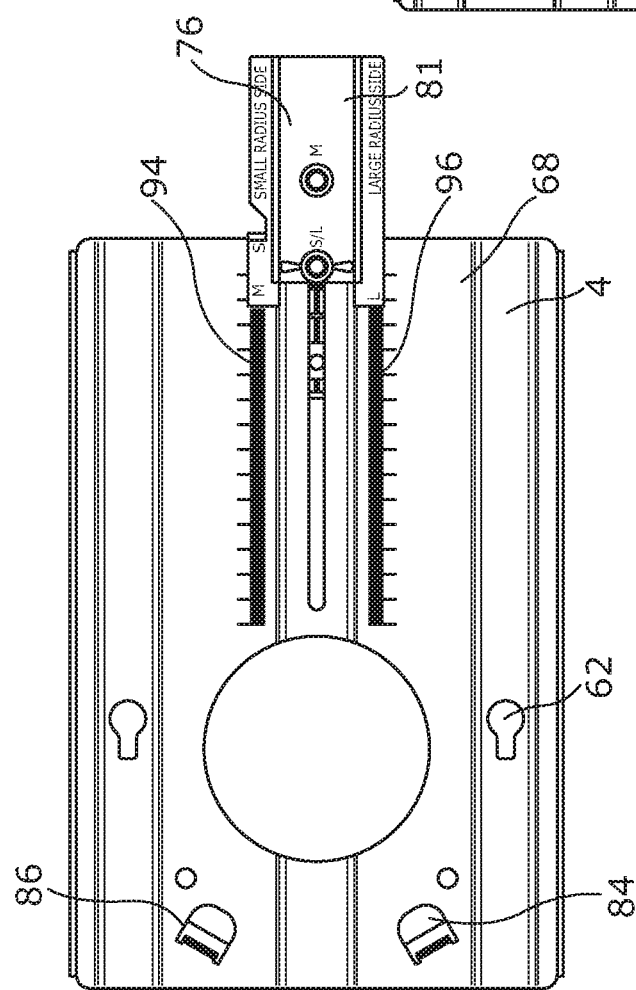
Figure 7I:
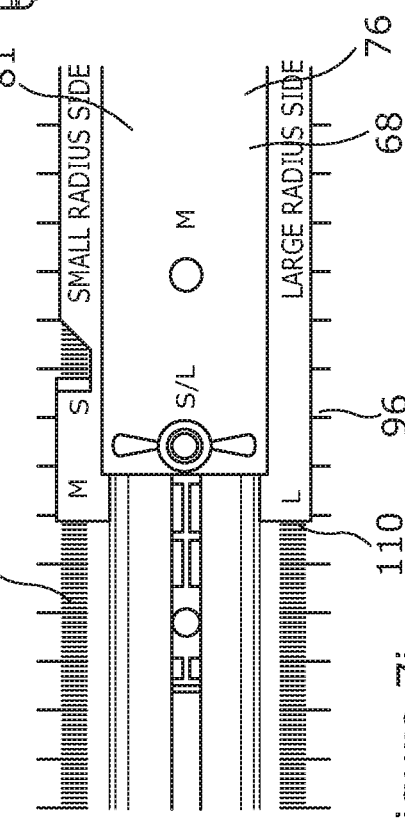
Figure 7J:
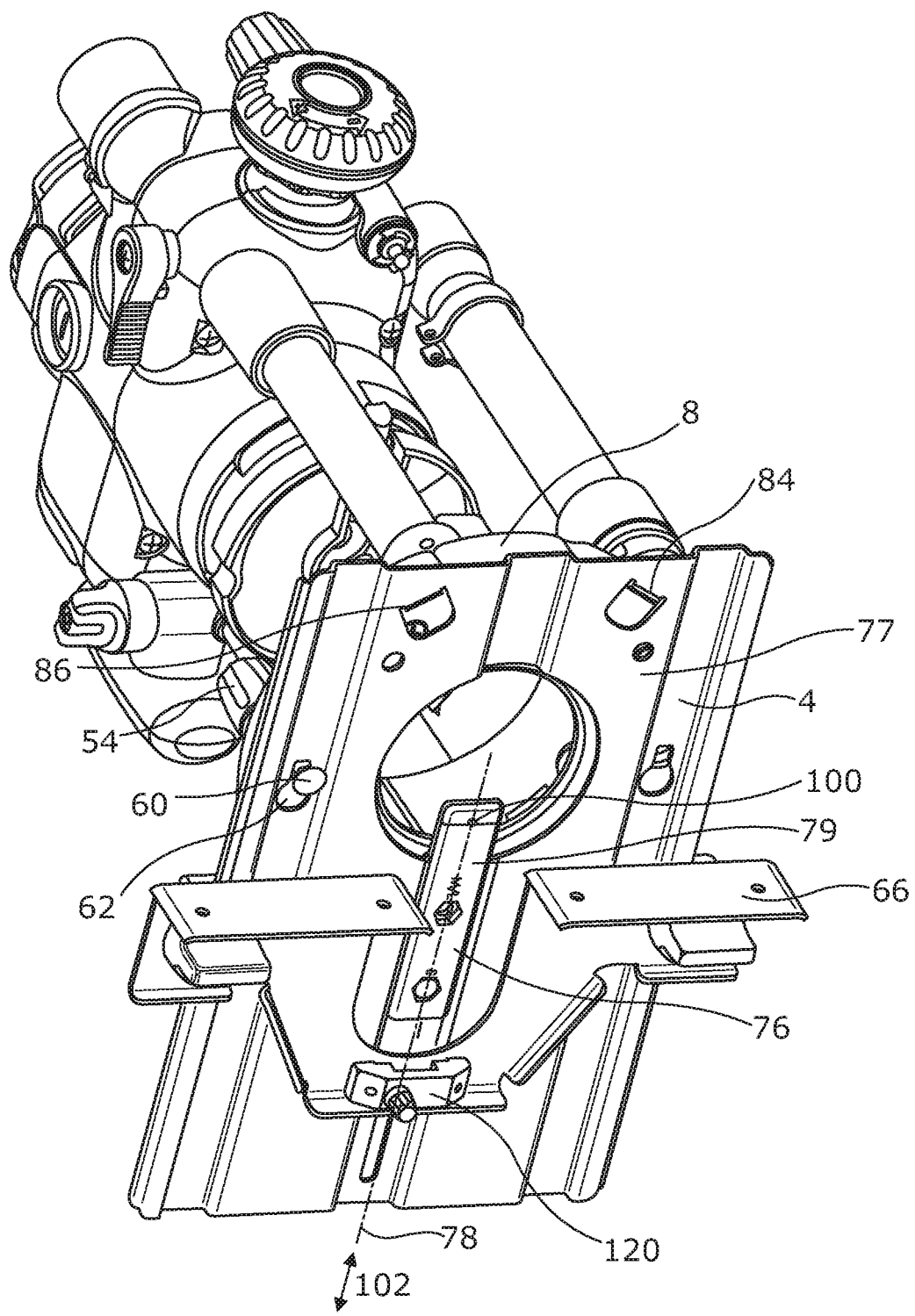

In FIGS. 7a-c the apparatus measurement location system is shown in a first configuration of use to provide measurement in a first mode on a first smaller dimension range, FIGS. 7d-f show the same apparatus in a second configuration of use to provide a second mode of measurement of a medium dimension range and FIGS. 7g-i show the same apparatus in a third configuration of use to provide a third mode of measurement on a larger dimension range. The apparatus as described therefore allows an extensive measurement range to be achieved using the apparatus in different configurations. In this example the three modes allow the following measurement diameter ranges to be achieved:

Mode 1—Small range 55.4-229 mm
Mode 2—Medium range 218 mm-300 mm
Mode 3—Large range 279 mm-526.7 mm FIG. 7j illustrates the underside of the guide plate 4 and illustrates the measuring location system or trammel which allows an extended circle cutting measurement range to be achieved by allowing an increase in the radius of circle which can be scribed by the measurement apparatus on the workpiece. The measuring system includes a sliding portion 76 which is provided in two parts a first part 79 which underlies the guide plate and a second part 81 which lies on the top surface 68 of the guide plate. The first and second parts 79, 81 can be selectively positioned in order to provide the three configurations of use along the axis 78 and can be moved as indicated by arrow 102 whilst the base 8 is located in the datum position against the tabs 84, 86 as previously described. The sliding portion 76 part 79 includes an aperture 100 in which a screw, pen, pencil or other scribing or marking implement can be secured so that the tip of the same is exposed on the underside 77 of the guide plate so that when the guide plate is rotated about an axis a circular path to be followed by the router tool can be accurately marked on the workpiece (not shown) which underlies the guide plate. The diameter of the scribed circular path can be measured and set using the apparatus in the manner now described with respect to FIGS. 7a-i.

FIGS. 7a,c,d,f,g,i illustrate the top face 68 of guide plate 4 and FIGS. 7b,e and h illustrate the underside 77. The guide plate 4 includes a measurement scale 94 for reference when the first and second range of measurements is required and a measurement scale 96 for reference when the third larger range of measurement is required. The respective measurement scales are located on opposite sides of the slidable portion 76 and on the top surface 68.

To provide the apparatus in the first configuration a locating member 102 is placed through the aperture 104 marked S on the part 79 and into the aperture marked S/L on the part 81. The edge 106 of the slidable portion 76 is then used to read the scale 94 and the slidable portion can then be moved to the required position. When the required position is reached the slidable portion 76 is locked in position by the nut 108 being tightened on the locating member 102 and guide plate and the circle with the desired diameter can then be scribed.

To provide the second configuration as shown in FIGS. 7d-f the locating member 102 is located through the aperture marked M/L in the part 79 and through the aperture marked M in the part and thereby alters the relative position of the parts 79,81. Furthermore a different edge, edge 108 is used to read the scale 94. Again the slidable portion 76 can be moved to the required position and, when reached, the slidable portion 76 is locked and the circular path with the desired diameter can then be scribed.

To provide the third configuration as shown in FIGS. 7*g-i* the relative positions of the parts 79 and 81 are again changed. In this case the member 102 is placed through the aperture marked M/L in the part 79 and through the aperture marked S/L in the part 81 and the part 76 can be sliding moved with the edge 110 being used to refer to the scale 96 to bring the portion 76 to the required position and then the same can be locked in position and the circular path scribed.

The invention claimed is:

1. A power tool comprising:
a housing and a base, said housing mounted to be moveable with respect to and spaced from the base, said housing including a motor, connected to rotate a tool holder for a cutting tool, said tool holder located at or adjacent to the base and said housing connected to the base by at least one extendable assembly, said cutting tool provided to be movable through an aperture in the base to contact with and perform work on a workpiece located on the side of the base opposing the side at which the housing is located and said base locatable with a work surface or a guide plate component to act as a guide for the tool via at least one engagement means provided on the power tool and which is movable between a first, engaging, position and a second release position, said engagement means including a gripping portion which is provided with an internal threaded formation to receive a shaft with which a locating head is formed or attached, said locating head provided to be received in an aperture or passage formed on the guide plate or worksurface and the shaft passes through an aperture in the base and into the internal threaded formation of the gripping portion which is located on the opposite side of the base from the locating head wherein the shaft is formed as two parts, a first part in threaded engagement with said internal threaded formation and a second part in which said locating head is formed and said second part is in threaded engagement with the first part and the locating head is movable to a selected one of a number of positions by rotation of the said gripping portion.

2. A power tool according to claim 1 wherein the base is engaged with the guide plate and a fence is selectively engageable therewith to position the base with respect to a workpiece on which work is to be performed.

3. A power tool according to claim 2 wherein measurement means are located on a fence plate to allow the distance from the fence to the cutting tool to be measured.

4. A power tool according to claim 2 wherein the fence is usable as a standalone item to measure the distance between the point of the cutting tool and a datum surface.

5. A power tool according to claim 1 wherein the said aperture is formed on the guide plate and the guide plate includes a trammel measuring system provided to be used in at least two modes a first mode to measure a first range of relatively small diameter circles and a second mode to measure a second range of circles of a relatively larger diameter.

6. A power tool according to claim 5 wherein the guide plate includes a first measurement scale for reference when the first range of measurement is required and a second measurement scale for reference when the second range of measurement is required.

7. A power tool according to claim 6 wherein the first and second measurement scales are located on opposite sides of a slidable portion which is adjustable adjusted to suit the required measurement mode, said slidable portion located with the guide plate in a first configuration for the first mode of measurement and in a second configuration for the second mode of measurement.

8. A power tool according to claim 1 wherein the guide plate is provided with a fence distance scale assembly to measure the distance of the fence from the tool centre to be measured.

9. A power tool according to claim 1 wherein a guide bush is selectively locatable with the base via a rotational movement of an engagement means about an axis, said engagement means comprise securing means, a locking component, said securing means provided to secure a locking component to the base or a component located with the base, while allowing rotation of the locking means which include a portion which, when in the engaging position, extends inwardly beyond the periphery of the aperture to a greater extent than the remainder of the locking means so as to secure the bush component in location with said base.

10. A guide plate according to claim 1 wherein a fence is engaged with the guide plate, said fence including measurement means to allow the distance from the fence to the cutting tool of the power tool to be measured.

11. A guide plate according to claim 1 wherein a measuring location system is provided for use in at least two modes, a first mode to measure a first range of circles of relatively small diameter and a second mode to measure a second range of circles of relatively larger diameter.

* * * * *